Figure 1:
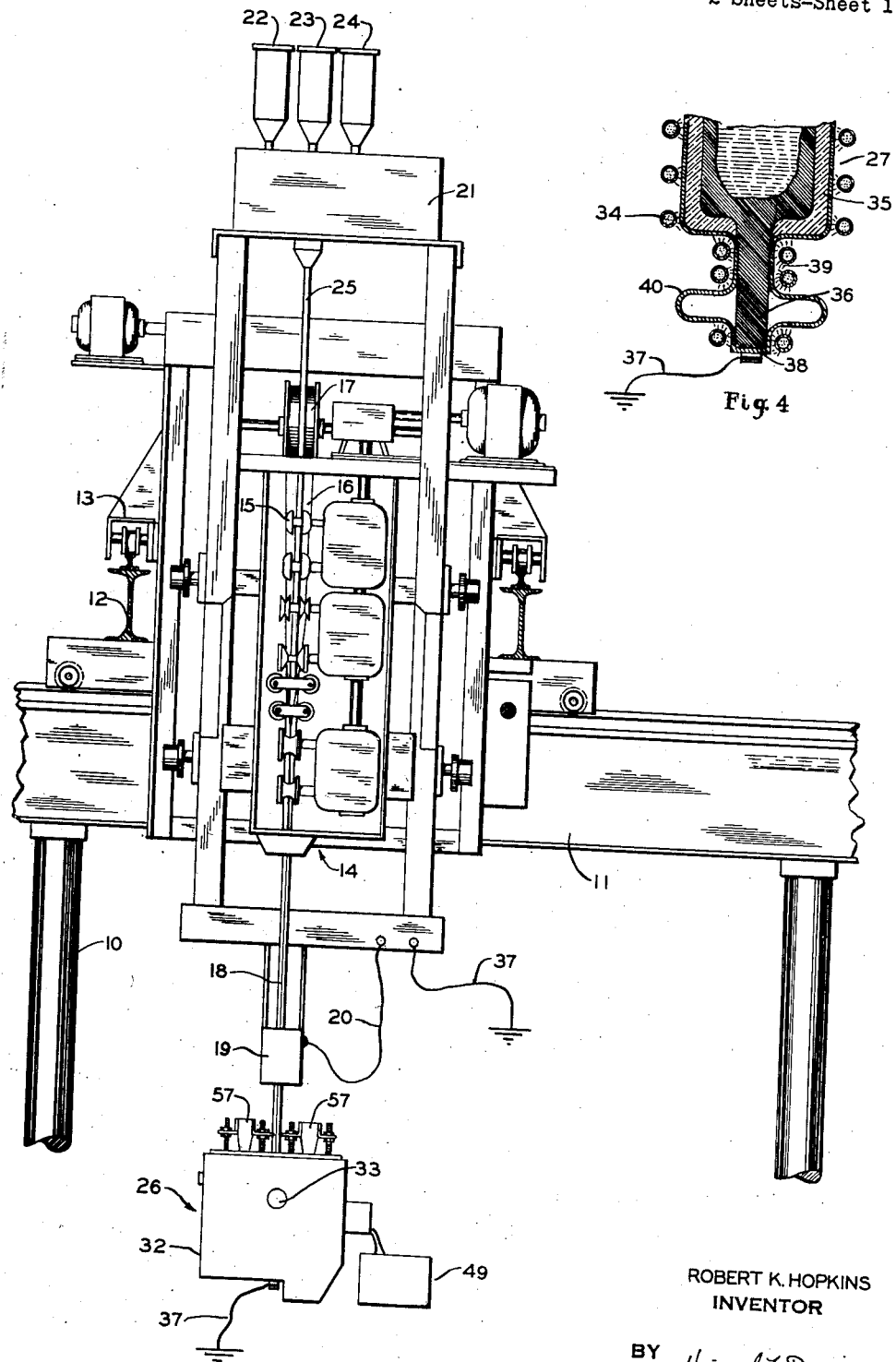

Feb. 9, 1943.                R. K. HOPKINS                2,310,635
                         METAL FUSING APPARATUS.
                         Filed Sept. 27, 1941                2 Sheets-Sheet 2
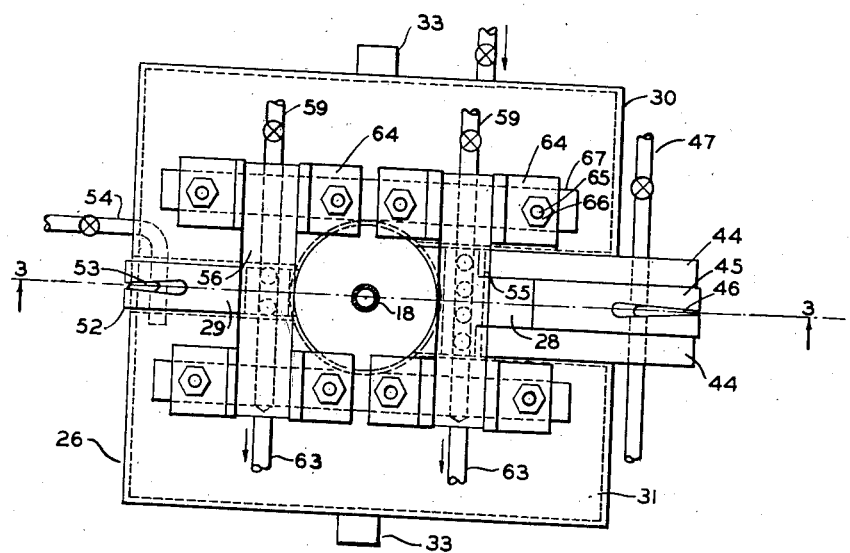
Fig. 2
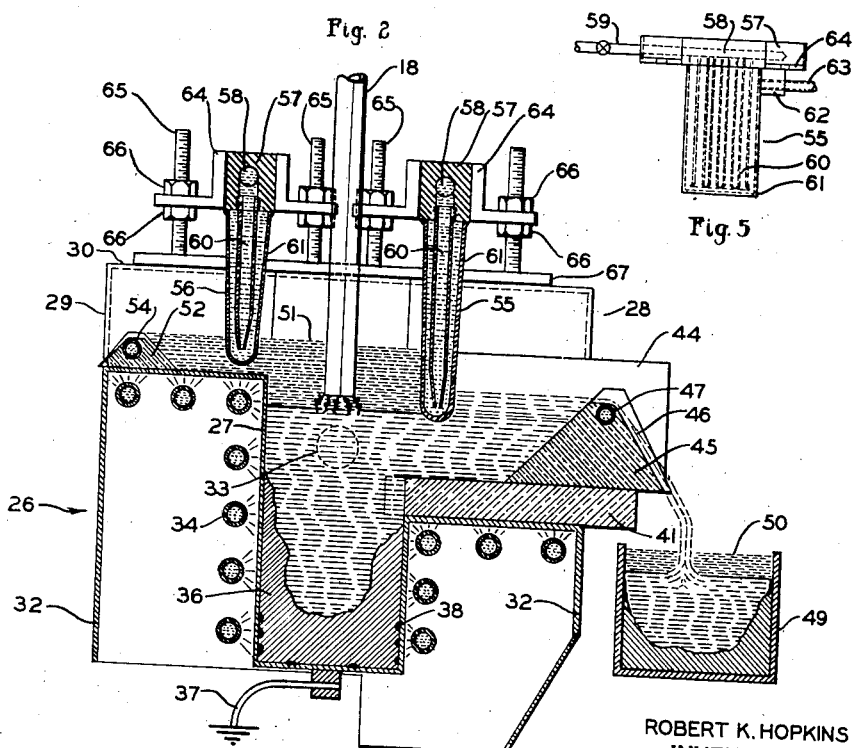
Fig. 3
Fig. 5
ROBERT K. HOPKINS
INVENTOR
BY Virgil F. Davies
ATTORNEY Patented Feb. 9, 1943

2,310,635

UNITED STATES PATENT OFFICE 2,310,635

METAL FUSING APPARATUS

Robert K. Hopkins, New York, N. Y., assignor to The M. W. Kellogg Company, New York, N. Y., a corporation of Delaware Application September 27, 1941, Serial No. 412,571

9 Claims. (Cl. 13—9)

This invention relates to the production of metal and in particular to apparatus for the continuous production of metal.

I have heretofore disclosed a method for continuously producing metal in which the constituents of the desired metal are supplied in the necessary proportions and at constant rates into a fusion zone wherein they are continuously converted into the desired metal. The desired metal thus produced is continuously removed from the fusion zone at the rate at which it is produced. The operating conditions are so adjusted and controlled that the desired metal withdrawn from the fusion zone is of constant character and analysis.

It is a primary object of this invention to provide novel apparatus, especially adapted for use in the continuous production of metal, which is of simple construction and is so arranged that the essential conditions of the metal producing operation may be easily and accurately adjusted and maintained.

It is also one of the important objects of this invention to provide novel apparatus, especially adapted for use in the continuous production of metal, which includes simple, removable arrangements capable of adjustment for maintaining desired depths of molten materials in the fusion zone; the arrangements being such that they do not deteriorate rapidly in use and when worn can be easily and conveniently replaced.

It is a further object of the invention to provide novel apparatus, especially adapted for use in the continuous production of metal, which includes a simple arrangement for preventing the destruction of the refractory lining of the fusion zone when the apparatus is allowed to cool to normal temperatures after use.

The further objects and advantages of the invention will be better understood from a consideration of the following description of a present preferred embodiment of the invention taken with the accompanying drawings, in which:

Fig. 1 is a front view of an apparatus assembly which includes a present preferred form of the apparatus of the invention, Fig. 2 is a plan view of the lower portion of the apparatus, Fig. 3 is a sectional view taken on line 3—3 of Fig. 2; in this figure the apparatus is shown as it appears in operation, Fig. 4 is a fragmentary sectional view corresponding to Fig. 3 showing a modification, and Fig. 5 is a front view of a skimmer element.

The apparatus of the invention while of general application is especially adapted for use in continuous metal producing operations. The apparatus of the invention may be used with various sources of heat such as the electric arc, electric induction, the gas flame, etc. Also, the raw materials that are required for the production of the desired metal may be supplied in various ways. For the purposes of this application the novel apparatus is disclosed in an installation that employs the electric arc as the heat source and supplies the raw materials required by means of and through a hollow metal electrode. A. C. or D. C. current may be used.

The apparatus installation shown includes a support 10, formed of structural members, provided with horizontal members 11 upon which a bridge 12 is mounted for movement. A truck 13 is mounted for movement on bridge 12. By means of this arrangement truck 13 may be moved in any horizontal direction.

An electrode forming and feeding mechanism 14 is supported on truck 13 and is movable vertically, manually or by motor operated means, relative to truck 13. The mechanism 14 includes a plurality of rollers 15 which are adapted to form a flat strip 16, supplied by a coil 17 also supported on truck 13, into a hollow electrode 18. Rollers 15 are driven by a variable speed motor which is arc controlled, as is common in the electric arc welding and electric arc furnace art, to form and feed electrode 18 as required to maintain an electric discharge of substantially constant characteristics from its end. In this way a substantially constant predetermined rate of fusion of electrode 18 may be obtained. If preferred, for the same purpose, electrode 18 may be fed at a constant rate, equal to the desired rate of burnoff, and the current supply adjusted to burn electrode 18 at the rate supplied.

Electrode 18 passes through a contact device 19 which is supported from mechanism 14. A cable 20 connects device 19 to one side of the electric current supply which may be a generator or a transformer, carried on truck 13 or elsewhere on or near the apparatus, or a connection to an outside current source.

Strip 16, out of which electrode 18 is formed, is made of one of the raw materials used to supply the constituents of the desired metal. When producing ferro-alloys whose major constituent is iron, strip 16 can conveniently be Armco iron or similar low carbon iron or steel. When the ferro-alloy is such that iron is only a minor constituent or large proportions of iron must be introduced with other constituents, strip 16 may be made of one, or more, of the other constituents.

A housing 21 is supported above mechanism 14 and in it are positioned a plurality of metering devices. The metering devices and housing 21 are movable with mechanism 14. Each metering device is arranged to receive material in the granular form from a hopper, such as hoppers 22, 23 and 24, and feed it at a constant but adjustable rate to a tube 25 that leads from housing 21 through rollers 15 into electrode 18. By this arrangement raw materials in the particle form containing constituents of the desired metal may be supplied at constant rates to the arc at the end of electrode 18. By properly adjusting the rates of burnoff of electrode 18 metal of the desired analysis may be constantly produced. The raw materials in the particle form are usually metallic but in some cases one or more of the constituents may be obtained from non-metallic raw materials. When non-metallic raw materials are used such raw materials are also metered through one or more of the metering devices. When additions to the flux are necessary these can also be made by metering through one of the metering devices.

Electrode 18 feeds into the fusion zone defined by member 26. Member 26 includes a body portion 27; while body portion 27 is generally of circular cross-section as shown it may be of any preferred cross-section. Channels 28 and 29 extend laterally from body portion 27. The side walls of the channels end at a common level and are united to top plates 30 and 31. Skirt pieces 32 are united to the top plates and to the walls of the channels to form a depending skirt which encircles body portion 27. Trunnion pieces 33 are attached to skirt 32, or to body portion 27, so that member 26 may be supported in operation and may be tilted at the end of the operation to remove the material therein.

Cylindrical body portion 27 is surrounded by a plurality of coils 34, similar coils are also provided beneath the bottoms of channels 28 and 29, which are supplied, as through a valve controlled line, with water or other heat exchange medium. Coils 34 are perforated to allow the heat exchange medium to jet against the surface to be cooled. Coils 34 may be individual coils whose supply of heat exchange medium is individually controlled or they may be connected and controlled as a unit. While the jetting of the heat exchange medium on the surface to be cooled is at present preferred, a jacket through which heat exchange medium is circulated may be substituted for coils 34. The coils are provided as an aid in controlling the temperature conditions within the fusion zone.

The walls of body portion 27 may be unlined, in such a case body portion 27 is preferably made of a metal of high heat conductivity, as for instance, copper. When desired or necessary, the walls of body portion 27 may be lined with a refractory lining, as lining 35 of Fig. 4. In the latter case body portion 27 may be made of any suitable metal. When a lining 35 is employed it is usually preferable to line only that portion of the fusion zone which contains the molten metal as the fluxes employed generally have a pronounced solvent action on the refractory material of the lining. In the bottom of body portion 27 is provided a metal plug 36 of preferably the same analysis as the metal to be produced. The bottom of body portion 27 is connected by a cable 37 to the other side of the electric current supply. It is preferable as shown, to ground the other side of the electric current supply and likewise ground the bottom of member 27. To assure a proper flow of current from the bottom of body portion 27 to plug 36 and to avoid excessive resistance heating, plug 36 is united to the bottom of body portion 27 by weld metal 38 as by brazing, spot welding, etc.

When the walls of body portion 27 are lined with refractory material 35 it is preferable to form the bottom of body portion as shown in Fig. 4. In this figure the bottom of body portion 27 includes a central extension 39 of reduced diameter. Extension 39 is enlarged intermediate its ends to provide one or more corrugations 40, one only being shown. The plug 36 employed is of a diameter to fit within extension 39 and is united by weld metal 38 to the bottom of extension 39. With this arrangement lining 35 will not be damaged when the metal in body portion 27 is allowed to cool and solidify at the end of an operation as corrugation 40 will allow plug 36 to move as required to relieve the pressure which tends to collapse lining 35.

Channel 28 is so located that its bottom is a substantial distance below the desired level of the molten metal in the fusion zone. The bottom of channel 28 is lined by a block 41 of refractory material. The sides of channel 28 are lined with refractory blocks 44. At the discharge end of channel 28 is positioned dam block 45 also of refractory material. Block 45 is generally triangular in cross-section and on its discharge side has a weir groove 46 cut therein which is shaped to confine the flow of the liquid metal and to reduce wear of block 45 by erosion to a minimum. Erosion of the top of the weir block will gradually change the height of the molten metal in the fusion zone; if the change proceeds far enough the conditions in the fusion zone will be altered. A constant height of molten metal may easily be maintained and erosion of block 45 kept to a minimum by positioning a tube 47 in the top of block 45, at or adjacent the floor of the top portion of groove 46, as shown in Fig. 2, and circulating water or other cooling medium at a high rate through the tube. Various heights of metal may be maintained in the fusion zone by using dam blocks 45 of different heights. The molten metal after it leaves groove 46, falls into mold 49, or other receptacle. A blanket of molten flux 50 may be maintained on the metal in mold 49.

Channel 29 ordinarily is unlined as the fluxes employed in metal producing operations generally have a pronounced solvent action on the usual refractory materials. The bottom of channel 29 is somewhat above the liquid metal level in the fusion zone so that only flux 51 will move into it. A metal dam block 52 is positioned adjacent the discharge end of channel 29. Block 52 is generally triangular in cross section and includes an appropriately shaped weir groove 53 through which the flux is adapted to flow. To prevent destruction of block 52 it is cooled by circulating of water or other heat exchange medium through tube 54. The circulation of the heat exchange medium is controlled by a valve in the inlet side of tube 54. Blocks 52 of various heights may be used.

Skimmers 55 and 56 project into channels 28 and 29 respectively. The skimmers aside from their height and width are of identical construction. Each includes a metal block 57 having a bore 58 therein that opens at one end of the block. A valved line 59 is threaded into the block and opens into the bore. A number of spaced tubes 60 are threaded into block 57 and communicate with bore 58. The ends of tubes 60 are restricted as by flattening them, so that the water or other heat exchange medium supplied by line 59 is jetted against the walls of casing member 61. The ends of tubes 60 are closely positioned so that a substantially continuous jet is produced. The casing member is preferably made of copper and is brazed or otherwise united to block 57. A threaded bushing 62 is brazed to casing member 61 and receives the threaded end of outlet pipe 63 through which the water or other heat exchange medium is evacuated. To each end of block 57 is united a pair of angle pieces 64 having holes therein for the accommodation of threaded studs 65. Nuts 66 are provided for positioning angle pieces 64 at predetermined levels on studs 65. Studs 65 are carried by strap pieces 67 that are united to the top plates 30 and 31. The arrangement just described is such to permit the rapid positioning, adjustment and removal of skimmers 55 and 56.

Skimmer 55 serves to separate molten flux 51 from the molten metal beneath it so that when the predetermined level of molten metal has been obtained in the fusion zone only molten metal can flow into channel 28 and over dam block 45. Skimmer 56 serves to separate molten flux from unfused material and assures that only molten flux will find its way into channel 29 and over dam block 52.

Flux 51 protects the metal during its production and refinement and until it passes beneath skimmer 55. The molten metal as it flows from skimmer 55 to mold 49 is exposed to the atmosphere. This exposure is ordinarily insufficient to deleteriously affect the metal. However, it is sometimes desirable to eliminate even this limited exposure. In such cases a covering of ceramic material may be provided to cover the metal from swimmer 55 to the outlet of groove 46; it may also be desirable to maintain an atmosphere of inert gas between this covering and the molten metal.

In carrying out any particular operation, after the raw materials to be used are selected, the rates of feed of the raw materials to be metered through the metering devices and the rate of feed of hollow electrode 18 are determined. The proper settings are made so that in operation there will be continuously supplied to the arc at the end of the hollow electrode the constituents of the desired metal in the proportions required to produce the predetermined analysis. The various valves controlling the flow of water, or other heat exchange medium to coils 34, tubes 47 and 54 and skimmers 55 and 56 are then opened. Electrode 18 is then fed until it closely approaches block 36 when an arc starter, such as a wad of steel wool is interposed between block 36 and the electrode. A quantity of flux, or the ingredients required to produce the flux is passed into member 27. The electric current circuit of electrode 18 is then closed.

The initial surge of current destroys the arc starter and establishes an arc between the end of electrode 18 and block 36. The heat generated by the arc fuses metal at the end of the electrode, the raw materials supplied through the electrode, the flux, or flux constituents and metal of block 36. The molten materials form a molten pool of metal over which is a molten pool of flux. The molten metals rapidly intermingle to form the desired metal. As the level of the molten materials rises molten flux and then molten metal flow into channel 28, when the level of the molten metal reaches the bottom of skimmer 55 the further flow of molten flux into channel 28 is prevented. The molten metal will ultimately rise to the desired level at which it will flow over dam block 45 into mold 49 at a rate equal to the rate it is produced. The flux that initially entered channel 28, will quickly be displaced by metal and from thence on only metal will flow over dam block 45. The molten flux while this is going on will flow into channel 29 and once it rises above the bottom of skimmer 56 only molten flux can pass from the fusion zone to and over dam block 52. In this way unfused materials, which may be flux ingredients or may contain constituents of the desired metal cannot flow out of the apparatus with the excess flux.

Once the liquid metal level has been established it will remain substantially constant throughout the operation. In operations wherein flux additions are made or materials are employed which include elements that are removed by the flux the flux level will be substantially constant and any excess flux will pass over dam block 52.

When the melting point of the metal produced is high it is sometimes advisable to commence the operation with skimmers 55 and 56 out of their respective channels and apply heat into channel 28 until molten material flows over dam block 45 in order to prevent freezing of the molten metal in channel 28. After a suitable flow of molten metal is obtained skimmers 55 and 56 may be quickly positioned. With the skimmers 55 and 56 shown and described it is a simple matter to do this.

I claim:

1. In apparatus for producing metal, a crucible member defining a fusion zone wherein molten metal is produced, means for flowing molten material from said fusion zone to a point external of said crucible member, said molten material flowing means including a dam element adapted to prevent the height of the molten material in the fusion zone from exceeding a predetermined level, said dam including a top and a sloped discharged side, a groove in the top and discharge side of said dam element adapted to provide a restricted flow path for the molten material, said groove diminishing in cross-section from the entering to the discharge end thereof, a hollow metal member in the upper portion of said dam element beneath said groove therein, and means for circulating cooling medium through said hollow member.

2. In apparatus for producing metal, a crucible member defining a fusion zone wherein molten metal is produced, a channel member having one end in communication with said fusion zone, a refractory member lining the bottom of said channel member, further refractory members lining the sides of said channel member, a refractory dam element having a generally triangular cross section on said refractory member and between said further refractory members, said dam element having a groove in its top and in its discharge side which diminishes in cross-section from the entering to the discharge end thereof, and a tubular metal member extending through said dam element, said tubular member being located in close proximity to the floor of said groove in the top of said dam element, and means for passing a cooling medium through said tubular member.

3. In apparatus for producing metal, a crucible member defining a fusion zone wherein molten metal is produced beneath a blanket of molten flux, a channel member having one end in communication with said fusion zone, a dam element at the other end of said channel member adapted to prevent the level of the molten material in the fusion zone from rising above a predetermined level, a skimmer element having metallic walls extending across said channel member between the ends thereof and projecting into said channel member a substantial distance below the top of said dam element, the metallic walls of said skimmer element defining an internal chamber, and means for circulating a cooling medium at a high velocity against the inner face of said walls below and adjacent the level of the top of said dam element.

4. In apparatus for producing metal, a crucible member defining a fusion zone wherein molten metal is produced beneath a blanket of molten flux, a channel member having one end in communication with said fusion zone, a dam element at the other end of said channel member adapted to prevent the level of the molten material in the fusion zone from rising above a predetermined level, a skimmer element extending across said channel member a substantial distance below the top of said dam element, said skimmer element including metallic walls of high heat conductivity defining an internal chamber, means for jetting a cooling medium against the inner face of said walls, and means for removing the cooling medium from said chamber.

5. A skimmer adapted for use with molten materials maintained at high temperatures comprising a body member, a casing member having walls made of a metal of high heat conductivity united to said body member and depending therefrom, a portion of said casing member being adapted in use to contact the molten materials, cooling medium jetting means carried by said body member and projecting into said casing member adapted to jet a cooling medium against the inner walls of said portion of said casing member, means for supplying a cooling medium to said jetting means, and means for removing said medium from said chamber.

6. A skimmer adapted for use with molten materials maintained at high temperatures, comprising a body member having a longitudinal bore therein closed at one end and open at the other end for connection to a source of cooling medium, a plurality of transverse bores entering said longitudinal bore, a tubular member in each of said transverse bores, said tubular members having a restricted outlet, a casing of metal of high heat conductivity united to said body member and enclosing said tubular members, and outlet means in said casing for the evacuation of the cooling medium.

7. In apparatus for producing metal, a crucible member defining a fusion zone wherein molten metal is produced beneath a blank of molten flux, a channel member having one end in communication with said fusion zone, a dam element at the other end of said channel member adapted to prevent the level of the molten material in the fusion zone from rising above a predetermined level, a removable skimmer element extending across said channel member between the ends thereof and projecting into said channel member a substantial distance below the top of said dam element, and means on said crucible member for supporting said skimmer member in said channel, said support means including means for adjusting the position of said skimmer member relative to the bottom of said channel, said skimmer member including metallic walls and means for cooling said walls.

8. In apparatus for producing metal, a metal crucible member having a body portion defining within it a fusion zone wherein metal is produced by heat supplied through the discharge of electric current, the bottom of said body portion including an extension of reduced diameter, a metal electrode member fitting in said extension and projecting into said fusion zone, one end of said electrode member being united to and movable with the end of said extension, and means intermediate the ends of said extension providing for movement of said electrode member and the end of said extension independently of remainder of said extension, the bottom and sides of said body portion being lined with non-metallic refractory material.

9. In apparatus for producing metal, a metal crucible member having a body portion defining within it a fusion zone wherein metal is produced by heat supplied through the discharge of electric current, the side and bottom walls of said body member defining said fusion zone being lined with a non-metallic refractory material, the bottom of said body member including an extension of reduced diameter, and a metal electrode member fitting in said extension and projecting into said fusion zone, the end of said metal electrode member being united to the end of said extension, said extension being enlarged to form a corrugation intermediate its ends to allow movement of the end of said extension with said electrode element independently of the remainder of said extension.

ROBERT K. HOPKINS.